United States Patent [19]

Gambetti

[11] Patent Number: 5,101,956
[45] Date of Patent: Apr. 7, 1992

[54] UNITS FOR STACKING PACKS PARTICULARLY IN WRAPPING SYSTEMS THAT USE A STRIP OF SHRINK-WRAP MATERIAL

[75] Inventor: Mario Gambetti, Crevalcore, Italy

[73] Assignee: Baumer S.R.L., Castelfranco Emilia, Italy

[21] Appl. No.: 652,042

[22] Filed: Feb. 7, 1991

[30] Foreign Application Priority Data

Feb. 21, 1990 [IT] Italy .................................. 3351 A/90

[51] Int. Cl.$^5$ .................................................. B65G 57/00
[52] U.S. Cl. ................................ 198/418.4; 198/475.1; 53/540
[58] Field of Search .................. 198/418, 418.4, 475.1, 198/797; 53/540

[56] References Cited

U.S. PATENT DOCUMENTS

| 4,380,283 | 4/1983 | van Maanen | 198/475.1 X |
| 4,585,113 | 4/1986 | Greenwell | 198/418.4 X |
| 4,646,908 | 3/1987 | Gambetti | 198/418.4 |

Primary Examiner—Joseph E. Valenza
Assistant Examiner—Tuan N. Nguyen
Attorney, Agent, or Firm—Herbert Dubno

[57] ABSTRACT

A stacking unit positioned between a machine that packs groups of products in single packs and a machine that wraps stacked packs using a strip of shrink-wrap material. A first horizontal conveyor is coplanar with the conveyors of the packing and wrapping machines and a pair of longitudinal closed-ring conveyors equipped with lifting devices in a constant vertical attitude are positioned either side of the first conveyor with the respective upper conveyor branch at different levels. The pair of longitudinal side conveyors equipped with the lifting devices have discs supported rotatably with their periphery at a higher level than that of the single packs being transferred onto the above-mentioned first conveyor.

1 Claim, 4 Drawing Sheets

UNITS FOR STACKING PACKS PARTICULARLY IN WRAPPING SYSTEMS THAT USE A STRIP OF SHRINK-WRAP MATERIAL

FIELD OF THE INVENTION

The present invention relates to improvements in units for stacking packs, particularly in wrapping systems that use a strip of a shrink-wrap material.

BACKGROUND OF THE INVENTION

Products wrapping systems can comprise a packing machine used particularly for groups of products in single packs using a strip of shrink-wrap material using where the said machines are of the type with preferably coplanar closed-ring horizontal conveyors and between which, according to Italian Patent No. 1,186.550, the stacking unit is inserted. A system of this type can comprise a first closed-ring horizontal conveyor coplanar with those of the machines as well as a pair of closed-ring longitudinal conveyors side by side, parallel and external on either of the said first horizontal conveyor and in which each conveyor of the pair of conveyors comprises one or more pairs of closed-ring conveyor devices side by side with the top branch of each pair of conveyor devices at different levels on respectively higher planes superimposed in relation to the plane of the first horizontal conveyor. The conveyor devices of the pair of conveyors are connected in an equidistant longitudinal position to a plurality of mirror symmetrical lifting devices for each pair of the conveyor devices. Operating devices serve to operate the said conveyor devices with continuous motion, to keep the mirror symmetrical lifting devices in a constant vertical attitude and to make the lifting devices oscillate around a horizontal axis parallel to the direction of movement of the respective conveyor devices to pick up and release the single packs being stacked.

These units are designed to stack packs particularly in wrapping systems that use a strip of shrink-wrap material in by using chains. Although they give excellent results as regards the quality of the stacked products and productivity per unit of time, i.e. they are high-speed units, the apparatus is referred to in the relevant technological jargon as operationally "rigid" units precisely because the corresponding conveyors are in the form of chains which have reached production speed limits which cannot be exceeded, i.e. a maximum speed which in the specific production sector is defined as second speed and so, obviously, these units are regarded as second-speed, or speed "two" units. These units can be contrasted with other units having chains, see U.S. Pat. No. 4,450,949, defined as first speed, or speed "one" machines. These so-called production-speed "two" stacking machines comprising one pair of one or more closed-ring chains spaced apart longitudinally side by side with corresponding lifting devices in a constant vertical attitude and with their top conveyor branch in motion at different levels, can in practice operate by lifting either the first product in the succession of products advanced on the first conveyor thus delaying its advance so as then take up position on the next product, or second product, in the stack to be obtained, or by lifting the second product, allowing the first one to pass by, and accelerating the movement of the chains to superimpose them.

It is precisely of the use of chains for lifting the first or second product to be stacked, particularly in stacking as described in the second case, i.e. stacking the second product on the first by accelerating the movement of the chains, that production speed limits are reached, the i.e. speed "two", which in practice cannot be exceeded by using chains.

OBJECTS OF THE INVENTION

The main object of the present invention is to provide conveyor devices with lifting devices in a constant vertical attitude capable of operating at high speed in both cases, i.e. whether it is the first product to be lifted and delayed, or the second to be lifted and accelerated.

Another object of the present invention is to provide conveyor devices with lifting devices in a constant vertical attitude in accordance with the previous object providing such devices with a homogeneously compact structure.

Yet another object of the present invention is to provide conveyor devices with lifting devices in a constant vertical attitude in accordance with the previous objects and such as to be particularly simple, of assured reliability and also relatively inexpensive, considering the high production performance results that can be achieved with them in practice.

SUMMARY OF THE INVENTION

These and other objects and advantages are attained according in present invention to the stacking units used in product wrapping systems comprising a packing machine used particularly for groups of products in single packs and a machine that wraps the packs using a strip of shrink-wrap material. The machines are of the type with preferably coplanar closed-ring horizontal conveyors and between which one of the said stacking units is inserted, essentially comprising a first closed-ring horizontal conveyor coplanar with those of the said machines as well as a pair of closed-ring longitudinal conveyors side by side, parallel and external on either side of the said first horizontal conveyor and in which each conveyor of the pair of conveyors comprises one or more pairs of closed-ring conveyor devices side by side with the top branch of each pair of conveyor devices at different levels on respectively higher planes superimposed in relation to the plane of the first horizontal conveyor. The conveyor devices of the said pair of conveyors are connected in an equidistant longitudinal position to a plurality of mirror-opposite lifting devices for each pair of the conveyor devices operating devices serve to operate the conveyor devices with continuous motion, to keep the said mirror-opposite lifting devices in a constant vertical attitude and to make the said lifting devices oscillate round a horizontal axis parallel to the direction of movement of the respective conveyor devices to pick up and release the single packs being stacked.

According to this invention the conveyor devices of the pair of conveyors with mirror-opposite lifts in a constant vertical attitude comprise a pair of discs with one or more discs side by side for each pair. Connected to the said disc or discs of each pair of discs is a corresponding plurality of the mirror-opposite lifting devices in a constant vertical attitude. Devices are provided to operate with continuous motion the pair of discs with one or more discs side by side for each pair, to keep the mirror-opposite lifting devices in a constant vertical attitude and to make the said lifting devices oscillate round a horizontal axis parallel to the direction of movement of the respective conveyor devices to pick up and release the single packs being stacked.

BRIEF DESCRIPTION OF THE DRAWING

Additional characteristics and advantages of the invention shall become clearer from the following detailed description reference being made to the attached drawing in which.

SPECIFIC DESCRIPTION

Figure 1:
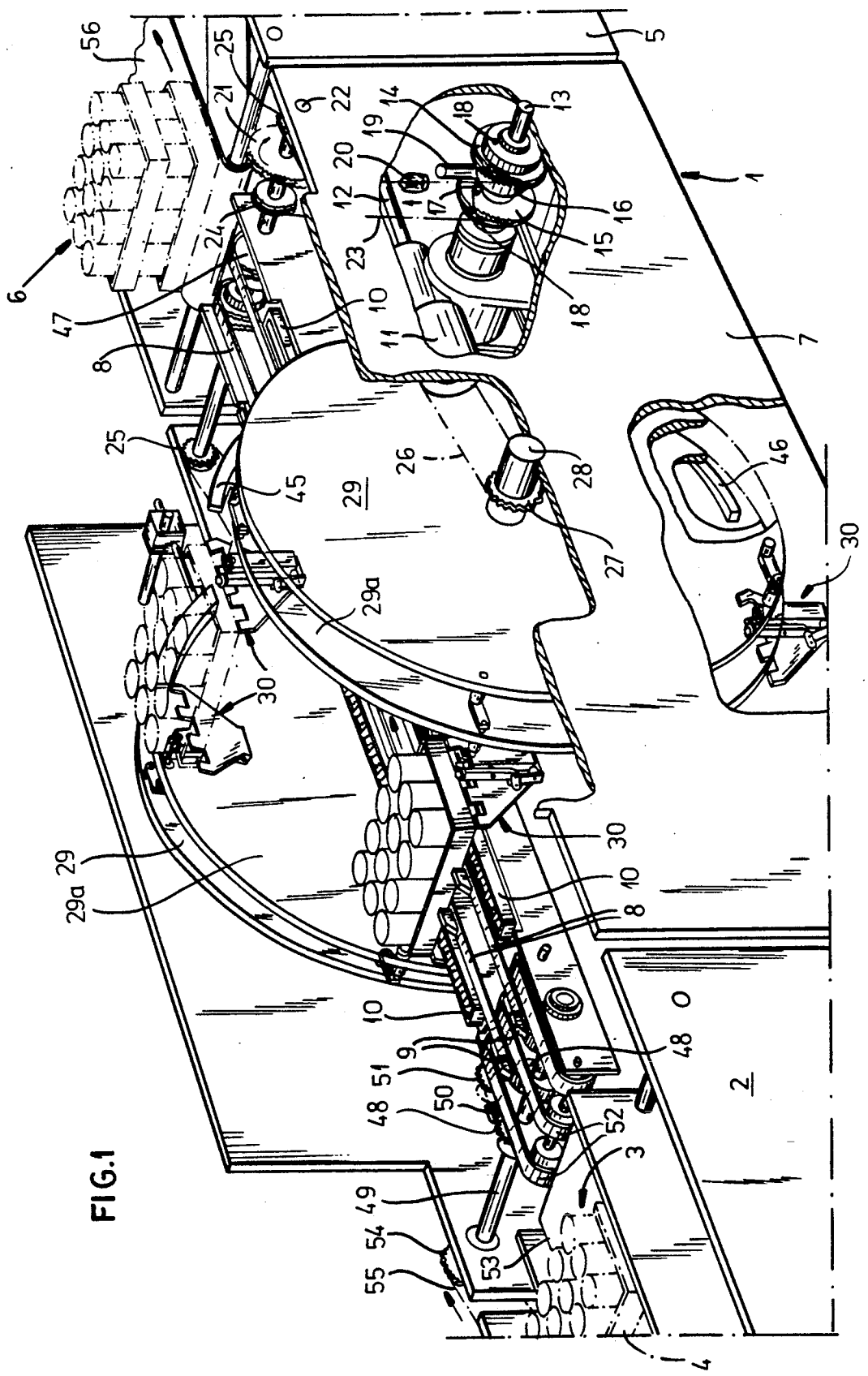
FIG. 1 shows schematically a partial front/side view in perspective of the improved unit in question incorporated in a wrapping system.

As stated above, the unit 1 is incorporated, see FIG. 1, in a wrapping system comprising a packing machine 2, particularly for groups of products in single packs 3, for example of the type in which the products are arranged on a supporting element in the form of a tray 4, and a machine 5 for wrapping the said packs 3 using a strip of shrink-wrap material.

For the sake of convenience and brevity, only the end parts of the machines 2 and 5 are shown, i.e. the part downstream part of packing machine 2 and the upstream part upstream of wrapping machine 5 most directly involved with the unit 1. The latter is in question the latter being, as stated above, positioned without interruption between the two machines 2 and 5.

In the case shown in the drawing, these two machines 2 and 5 are of a type with closed-ring horizontal and coplanar conveyors for supplying packs 3 to be stacked to the stacking unit 1 and for receiving stacks 6 of the packs 3 formed in the said intermediate unit 1 to be wrapped in a shrink-wrap strip by the wrapping machine 5.

Unit 1, is for forming stacks 6 of packs of products formed by two single packs 3 and comprises a base 7 supporting a conveyor surface coplanar with the horizontal conveyors of packing machine 2 upstream and of the wrapping machine downstream. The said conveyor surface is made up of two closed-ring conveyors 8, extending longitudinally and parallel to each other, of the so-called caterpillar type with thrust blocks 9 and two support and sliding roller guides 10 arranged to be parallel and side by side external to the said caterpillar conveyors 8.

A single ratio motor 11 supported inside base 7 drives both the stacking unit 1 and the said two machines 2 and 5.

This ratio motor 11 has an output shaft 12 to drive in a known way, as shown, wrapping machine 5 and a slow output shaft 13 to drive, as described below, the stacking unit according to the present invention and packing machine 2.

On the slow output shaft 13 two chain wheels 14 and 15 are mounted freely and between these two wheels is splined sliding on the shaft 13 a sleeve 16 with opposing engagement pins 17 designed to entrain in rotation, by entering holes 18, one or other of the said two chain wheels 14 and 15 when the sleeve 16 is moved axially by means of manual-action control lever 19. Around chain wheel 14 is wound a drive chain 20 also wound around a chain wheel 21 splined onto a horizontal shaft 22 supported transversely rotatably by the side of base 7. Around chain wheel 15 is wound a drive chain 23 which also winds around a second chain wheel 24 also splined onto the said horizontal shaft 22.

The diameters of the said two chain wheels 21 and 24 are selected for the direct passage of packs 3 from packing machine 2 to wrapping machine 5 through unit 1 without stacking of the packs 3 and for the number of the said packs per stack which is to be obtained by the unit 1. In the case of the stacking unit shown, as stated above, the stacks that can be obtained comprise two packs 3.

On the horizontal shaft 22 is also splined, as shown in FIG. 1, close to the front of base 7 which supports it, a third chain wheel 25 designed to transmit the movement to the stacking organs, described in greater detail below, of the unit 1. In fact, around the chain wheel 25 is wound a drive chain 26 which also winds round a chain wheel 27 splined onto a horizontal shaft 28 supported freely transversely and projecting towards the inside of unit 1 from the front longitudinal shoulder of base 7. On the shaft 28 is splined a pair of coaxial discs 29 and 29a of such a diameter that their top point is at higher level than that of the said conveyor surface made up of the said caterpillar conveyors 8 and support and sliding roller guides 10.

Discs 29 and 29a support in an equidistant manner, four lifting mechanisms or devices shown as a whole by 30.

Figure 2:
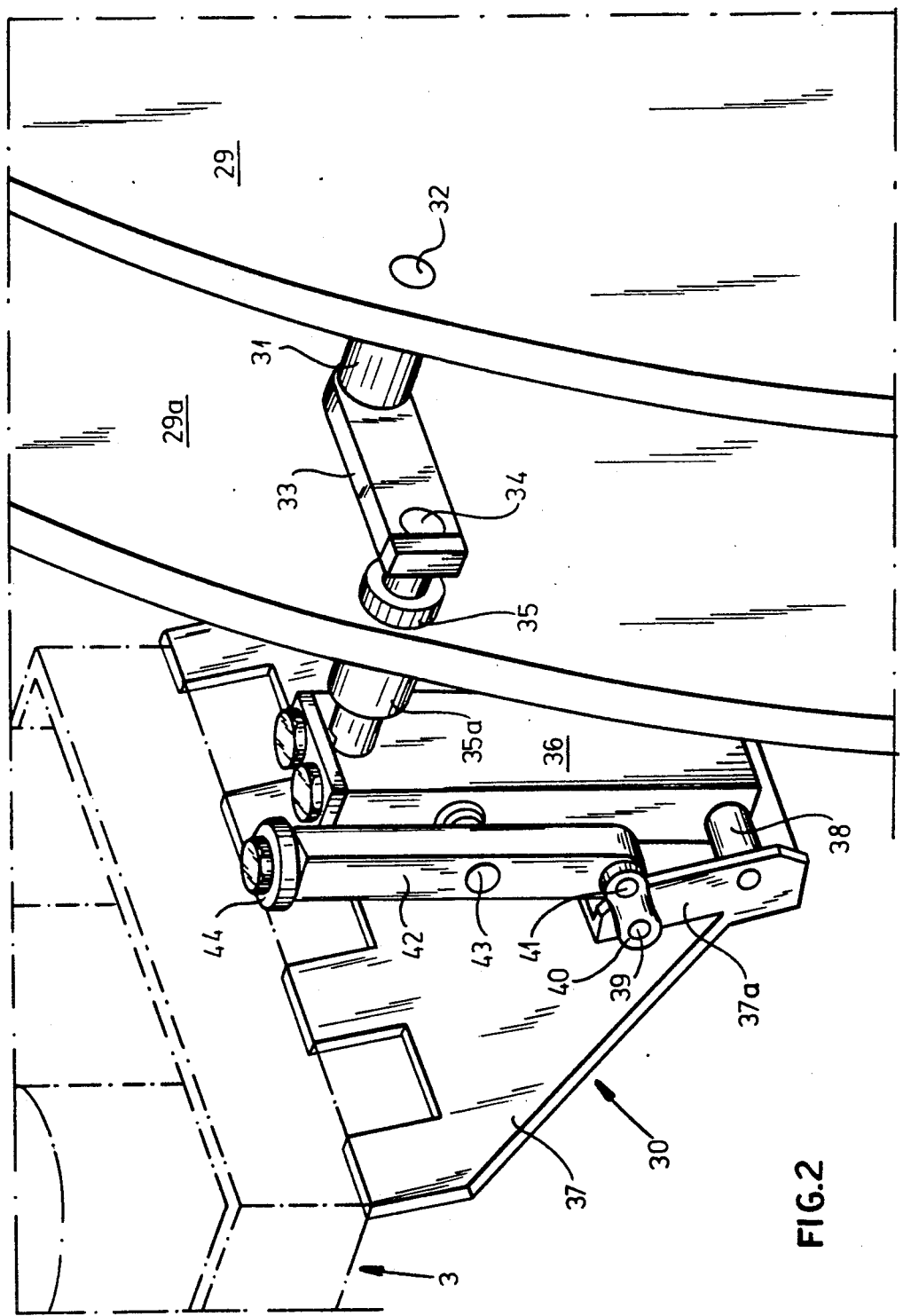
FIG. 2 shows a view in perspective of an enlarged-scale detail of the said improved unit.

Each of the lifting devices 30 comprises, see in particular FIG. 2, a block 31 fixed to the periphery of disc 29 and having a pin 32 onto which is mounted rotatably free at one of its ends an arm 33 to the other end of which is fixed the end of a spindle 34 extending horizontally and projecting towards the inside of unit 1. This spindle 34 passes rotatably through two blocks that have collets 35 and 35a fixed on the periphery on either side of disc 29a and at its other end is fixed a support element 36 extending vertically downwards. A lifting plate-shaped element 37 terminating at the top in a comb shape is hinged at the bottom end of the said support element 36 by means of a horizontal pin 38. The lifting element 37 has at its end hinged at 38, a lever arm 37a at whose free end is hinged at 39 the end of a connecting bar 40 the other end of which is hinged at 41 to the end of a lever 42 pivoted at an intermediate point 43 to the support element 36 and having at its other end a cam-follower roller 44 freewheeling round a vertical axis designed to operate, as described later in more detail, on cam elements 45 and 46 positioned, see FIG. 1, along the top and bottom path of discs 29 and 29a respectively (see FIG. 1).

A conveyor/lifting system the same as that previously described essentially comprising two discs 29 and 29a and relative lifting devices 30 is positioned in mirror-opposite relation to the first-mentioned system and therefore the parts that comprise it bear the same reference numbers as those borne by the parts of the system described in detail. It is also driven in a mirror symmetrical manner by means of a corresponding chain wheel 25 and chain 26.

The drive of the caterpillar conveyors 8 is achieved by means of toothed wheels 47 splined onto driven shaft 22 and toothed wheels 48 splined onto a shaft 49. Around one of these toothed wheels 48 is wound a chain 51 which drives intermediate conveyor belts 52 between the conveyor devices 8 of stacking unit 1 and packing machine 2 whose output conveyor is driven by a wheel 54 splined onto the shaft and a relative chain 55. By contrast, conveyor 56 of wrapping machine 5 is, as stated, driven by the fast shaft 12 of ratio motor 11.

Figure 3:
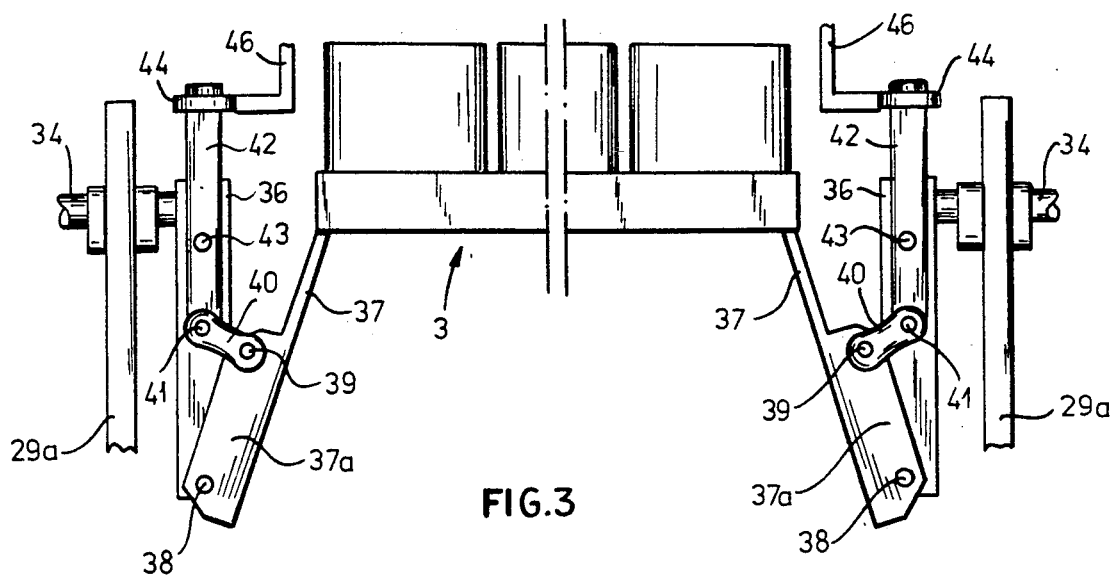
FIGS. 3 and 4 show end views of the detail shown in FIG. 2 in similar operating positions.
Figure 4:
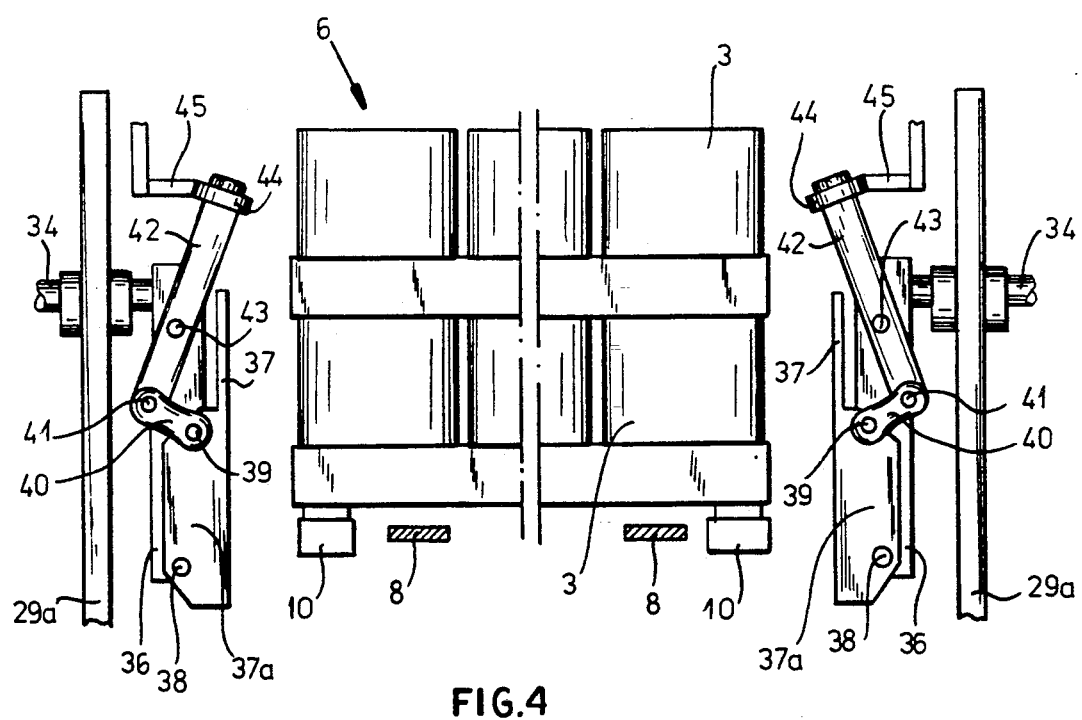
Figure 5:
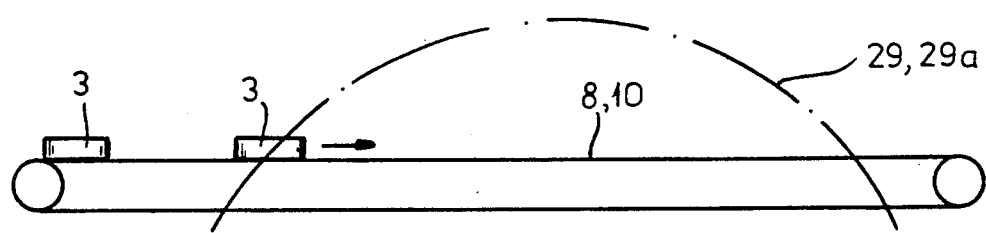
FIGS. 5 to 8 show a succession of operating positions of the stacking organs of the improved unit.
Figure 6:
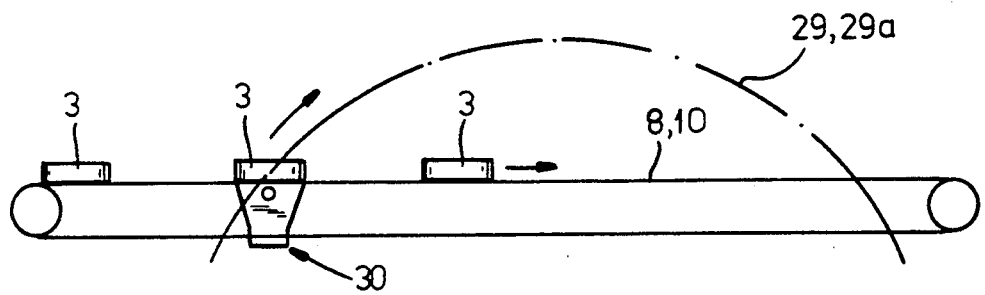
Figure 7:
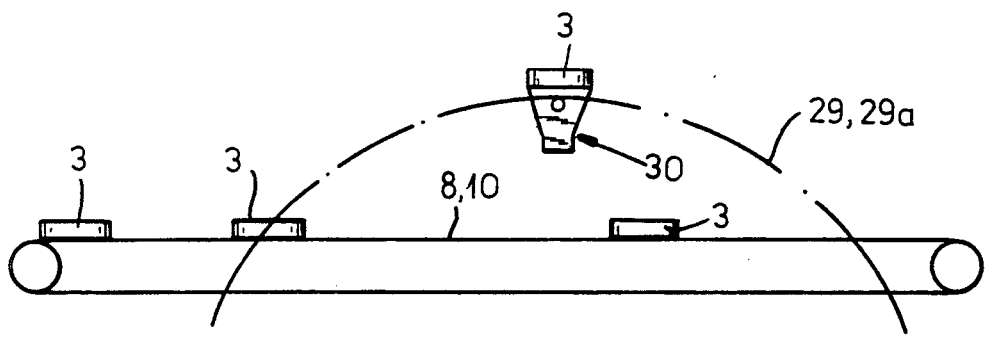
Figure 8:
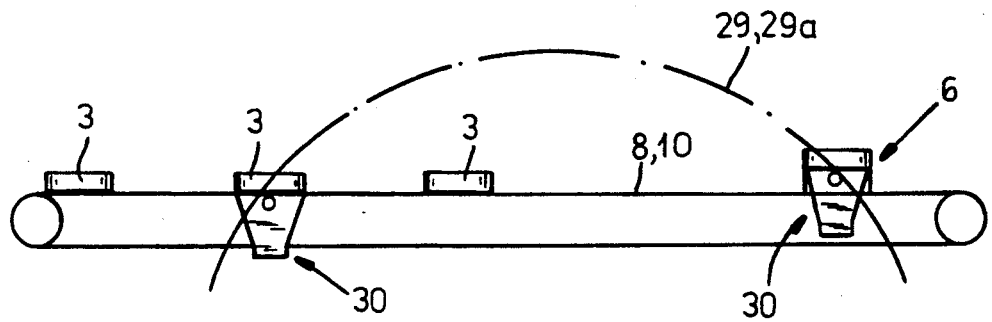

The operation of the system and stacking unit 1 according to the present invention is as follows:

packs 3 arrive in single succession on the output conveyor 53 of packing machine 2 and from the conveyor 53 move onto intermediate conveyor 52 from where they are alternately engaged by blocks 9 of conveyors 8 and respectively by lifting devices 30. The pack engaged by the mirror-opposite lifting devices 30 is lifted through the peripheral path defined by discs 29 and 29a and kept in a horizontal position due to the effect of the joint between pin 32 and block 31 fixed to disc 29, and then placed on top of the preceding pack, which has in the meantime arrived downstream and beneath it on conveyor devices 8 and 9, as a result of the mirror-opposite lifting devices 30 being opened by means of cam elements 45 on which free rollers 44 act (see FIG. 4). The lifting devices 30 are closed again (see FIG. 3) during the return movement by means of cam elements 46. The stacks of packs 6 thus obtained then reach conveyor 56 of wrapping machine 5 which wraps them in a shrink-wrap strip according to the state of the art. FIGS. 5 to 8 show schematically the same stages in the course of stacking packs 3 using unit 1 in question.

The description of the improvements to the unit in question referring to the attached Figures is obviously given purely by way of example and clearly any modifications and variations prompted by practical application, their implementation and utilisation or use may be made and are any event covered by the following Claims.

I claim:

1. Improvements to a stacking unit used in a product wrapping system comprising a packing machine used particularly for groups of products in single packs and a machine that wraps the said packs using a strip of shrink-wrap material where the said machines are of the type with preferably coplanar endless horizontal conveyors and between which a stacking unit is inserted, the stacking unit essentially comprising a first endless horizontal conveyor coplanar with those of the said machines as well as a pair of endless longitudinal conveyors side by side, parallel and external on either said of the said first horizontal conveyor and in which each conveyor of the said pair of conveyors comprises one or more pairs of endless conveyor devices side by side with the top branch of each pair of conveyor devices at different levels on respectively higher planes superimposed in relation to the plane of the said first horizontal conveyor and where the said conveyor devices of the said pair of conveyors are connected in an equidistant longitudinal position to a plurality of mirror-opposite lifting devices for each pair of the conveyor devices, operating devices being provided to operate the said conveyor devices with continuous motion, to keep the said lifting devices in a constant vertical attitude and to make the said lifting devices oscillate round a horizontal axis parallel to the direction of movement of the respective conveyor devices to pick up and release the single packs being stacked, the improvement being characterized in that the said conveyor devices of the said pair of conveyors with mirror-opposite lifting devices in a constant vertical attitude comprise a pair of discs with one or more discs side by side for each pair; connected to the said disc or discs of each pair of discs is a corresponding plurality of the said mirror-opposite lifting devices in a constant vertical attitude, there being devices to operate in continuous motion the said pair of discs with one or more discs side by side for each pair, to keep the said mirror-opposite lifting devices in a constant vertical attitude and to make the said lifting devices oscillate around a horizontal axis parallel to the direction of movement of the respective conveyor devices to pick up and release the single packs being stacked.

* * * * *